United States Patent [19]

Coutandin et al.

[11] Patent Number: 4,919,851

[45] Date of Patent: Apr. 24, 1990

[54] PROCESS FOR PRODUCING AN OPTICAL COUPLER FOR POLYMER OPTICAL WAVEGUIDES

[75] Inventors: Jochen Coutandin, Bretzenheim; Jürgen Theis; Werner Groh, both of Frankfurt am Main; Peter Herbrechtsmeier, Königstein, all of Fed. Rep. of Germany

[73] Assignee: Hoechst Aktiengesellschaft, Fed. Rep. of Germany

[21] Appl. No.: 267,030

[22] Filed: Nov. 4, 1988

[30] Foreign Application Priority Data

Nov. 7, 1987 [DE] Fed. Rep. of Germany ....... 3737930

[51] Int. Cl.$^5$ .............................................. B29D 11/00
[52] U.S. Cl. ..................................... 264/1.5; 264/230; 264/248
[58] Field of Search ....................... 264/1.5, 230, 248; 350/96.15, 96.24; 65/4.2, 4.3, 13, 36; 156/86, 296

[56] References Cited

U.S. PATENT DOCUMENTS

| | | | |
|---|---|---|---|
| 2,484,003 | 10/1949 | Simison | 65/36 |
| 3,198,059 | 8/1965 | Phaneuf et al. | 264/1.5 |
| 4,544,231 | 10/1985 | Peterson | 350/96.15 |
| 4,586,784 | 5/1986 | Tremblay et al. | 350/96.15 |
| 4,772,085 | 9/1988 | Moore et al. | 350/96.15 |

OTHER PUBLICATIONS

Fiber and Integrated Optics, vol. 6, No. 1, pp. 27–53, 1987.

Primary Examiner—Joye L. Woodard
Attorney, Agent, or Firm—Connolly and Hutz

[57] ABSTRACT

High-efficiency optical couplers for polymer optical waveguides are obtained when optical waveguides are bundled and fused by means of a piece of plastic shrink sleeve, the plastic shrink sleeve being heated above the shrinkage temperature. The process is simple and cost-advantageous.

6 Claims, No Drawings

PROCESS FOR PRODUCING AN OPTICAL COUPLER FOR POLYMER OPTICAL WAVEGUIDES

DESCRIPTION

The invention relates to a simplified process for producing an optical coupler for polymer optical waveguides.

In passive optical waveguide networks couplers serve as optical components for splitting the light signals from incoming optical waveguides to outgoing optical waveguides. Such couplers comprise a transparent body, which is connected to the light entry side and to the light exit side with optical waveguides. In addition to the couplers which arise when transparent molded parts are bonded or fused together with optical waveguides, couplers are also known for the production of which optical waveguide bundles are twisted and stretched at the twisting location (cf. Agarwal, Fiber Integr. Optics 6 (1), 27–53, 1987).

However, the production of composite couplers is elaborate and expensive. Moreover, it is difficult to reproduce the transmission loss of the known couplers. Between different output fibers the power fluctuates by more than 1 dB.

The object was therefore to find a process with which it is possible to produce couplers simply and in a cost-advantageous fashion, and which provides couplers with low output attenutation and slight power fluctuations between the output fibers.

It was found that it is possible to produce a high-efficiency coupler in a simple fashion, if a piece of plastic shrink sleeve is employed to bundle and fuse the optical waveguides.

The invention therefore relates to the process described in the claims.

For the process according to the invention two to $10^5$, preferably 2 to 1000 polymer optical waveguides are arranged unidirectionally and bundled. It is possible to twist the optical waveguides. A piece of plastic shrink sleeve is pushed over the bundle over the junction provided. The piece of shrink sleeve has a length of 5 to 200, preferably 10 to 100 mm and a diameter of 0.5 to 50, preferably 1 to 20 mm.

The shrink sleeve is composed of a polyolefin, polyvinyl chloride, polyvinyl fluoride, polyvinylidene fluoride, polytetrafluoroethylene, polychloroprene, vinylidene fluoride/hexafluoropropylene copolymer, silicone rubber, polyester, fluorinated ethylene/propylene copolymer or polyfluoroalkoxy copolymer, preferably of a polyolefin, polyvinyl chloride, polyvinylidene fluoride or silicone rubber.

The shrink sleeve can be black, transparent or colored. If it is transparent, its refractive index n preferably lies in the range from 1.35 to 1.6. It is also possible to use a shrink sleeve whose inner wall is coated with a thermoplastic plastic having a refractive index n of from 1.35 to 1.6. In general, the shrink sleeve with internal coating is composed of a polyolefin.

Moreover, it is possible to employ double shrink sleeves. These sleeves comprise an inner and an outer shrink sleeve. When the shrinkage temperature of the outer sleeve is reached, the inner sleeve is already thermoplastic. The pressure exerted by the outer shrink sleeve is sufficient to produce a good connection between shrink sleeve and polymer optical waveguides. It is also conceivable to wrap the fiber bundle with a transparent, thermoplastic strip or a foil before pushing over the shrink sleeve. Starting from a definite temperature, which can lie above or below the shrinkage temperature of the sleeve, the strip or the foil becomes thermoplastic and serves, especially in the application of unclad polymer optical waveguides, as an optical isolator. The refractive index of the strip or of the foil must then be lower than that of the core of the polymer optical waveguide.

The piece of plastic shrink sleeve is then heated to a temperature of 50 to 330, preferably 80° to 200° C. At this stage, the diameter of the tubing contracts by an amount dependent on the nature of the shrink sleeve, in general by the ratio 1.2:1 to 4:1.

If the heating temperature T of the tubing is less than the softening temperature $T_E$ of the optical waveguide, a tight bundling of the waveguides ensues, if T is higher than $T_E$, the individual waveguides fuse together. In this process, the fiber bundle surrounded by the shrink sleeve can be stretched symmetrically or asymmetrically during or after the heating, so that a biconical profile with a waist in the middle (biconical taper) is formed. This biconical profile can also be achieved without stretching by heating the middle of the shrink sleeve more intensely than the ends.

The wall thickness of the shrink sleeve in the shrunk state lies in the range from 0.1 to 4 mm.

The process according to the invention is suitable for all polymer optical waveguides with and without optical cladding, or polymer optical waveguides on which the cladding has been removed mechanically or chemically in the region to be fused. In this connection, it is preferable to use optical waveguides without optical cladding at the junction for couplers for transmitting data light signals, and preferable to use those which have cladding for fiber bundles for lighting applications. Suitable optical waveguides, which are to be capable of thermoplastic processing, have a diameter of 0.1 to 3, preferably 0.5 to 1.5 mm, and a core of, for example, PMMA (core refractive index $n_K=1.49$), PS ($n_K=1.59$) or PC ($n_K=1.585$).

It is possible to produce the most varied types of coupler advantageously with the aid of the process according to the invention.

For star couplers, in which the number of optical waveguides arriving at and leading from the transparent body (=mixer) is the same (=star coupler with transmission mixer), the advantages lie in the very simple and cost-advantageous production technique, and in the very good transmission properties, especially in the low power fluctuation between the individual gates. A further advantage is that the production process automatically gives a mechanical strength to the mixer rod, which no longer needs to be specially stabilized.

For so-called T-couplers (one input-two outputs or two inputs-one output), too, there is an advantage in the very simple production method and in good transmission properties. A further advantage is provided by the identical diameter of the inputs and outputs, so that connectors can be mounted without problems. Here, too, the mechanical strength of the mixer rod is occasioned by the shrink sleeve.

The process according to the invention may also be applied with advantage for producing fiber bundles for lighting applications, by manufacturing a star coupler and bisecting it. Here, too, the advantage lies in the very simple production technique, as well as in the very high light transmission of the bundle, which is achieved in that there is no free space (termed interstice) at the end face of the bundle between the individual fibers, which leads to light losses.

The following examples illustrate the invention.

EXAMPLE 1

Production of a 4×4 star coupler with transmission mixer

Four 20 m long plastic optical waveguides of PMMA without optical cladding having a diameter of 0.5 mm in each case were bundled incoherently. The refractive index of the fibers amounted to $n=1.49$.

Thereafter, a 3 cm long transparent shrink sleeve of polyvinylidene fluoride having an internal diameter of 1.2 mm was drawn over this bundle, and placed in the middle there. The refractive index of the shrink sleeve amounted to $n=1.42$.

Thereafter, the ends of the bundle were fixed, and the temperature in the region of the shrink sleeve was increased to 180° C. On reaching this temperature, the shrink sleeve began to shrink, and the fibers, whose softening temperature lay below 180° C., were fused with one another. The fused region (termed mixer rod) had a round shape with a length $l=2.5$ cm and a diameter $d=1$ mm. Since the polyvinylidene fluoride shrink sleeve with $n=1.42$ had a lower refractive index than PMMA ($n=1.49$), the shrink sleeve acted simultaneously as optical cladding. At the boundary layer between mixer rod and polyvinylidene fluoride shrink sleeve the light running in the mixer was totally reflected, so that hardly any light could penetrate to the outside. The shrink sleeve served simultaneously as protective sheath for the brittle mixer. The projecting ends were dipped in a bath, with polysiloxane resin varnish as bath fluid. Since the polysiloxane with $n=1.43$ had a lower refractive index than that of the fiber material ($n=1.49$), the varnish layer acted as a totally reflecting optical cladding.

The 4×4 star coupler with the transmission mixer had a transmission loss of 10 dB with a power fluctuation between arbitrary output fibers of 0.6 dB.

EXAMPLE 2

Production of a 1×2 coupler (T-coupler)

Two 15 cm long and 1 mm thick polystyrene optical waveguides having PMMA as cladding material were collimated and twisted. Prior to this the PMMA cladding was mechanically removed in the region to be fused. The refractive indices of PS and PMMA amounted to $n=1.59$ and $n=1.49$, respectively.

Thereafter, a 4 cm long polyolefin shrink sleeve having an internal diameter of $d=2$ mm was drawn over the location of the twisted fibers, from which the cladding had been mechanically removed. The two ends of the bundle were fixed.

On being heated to over 150° C. in a cartridge heater, the sleeve contracted. The twisted fibers, which were processed thermoplastically at 150° C., fused with one another owing to the shrinking force. The diameter of the fused region (termed mixer rod) amounted to $d=1.4$ mm. Thereupon, the mixer rod was stretched together with the shrink sleeve at a temperature of 140° C. until the mixer rod had reached the diameter of the individual fibers of 1 mm. After cooling, the mixer rod was separated in the middle, and the shrink sleeve was removed at the separated end of the mixer rod over a range of 1 cm. The exposed end was dipped, as described in Example 1.

The 1×2-coupler had an optical power/split ratio of 1:1 with a transmission loss of 4.2 dB.

EXAMPLE 3

Production of a fiber bundle for lighting applications 300 clad PMMA optical waveguide fibers having an individual diameter of 0.5 mm and a length of 1 m were bundled. At one end of the bundle a polyolefin shrink sleeve having an internal diameter of 12 mm and a length of 8 cm was drawn over. The two ends of the fiber bundle were fixed under light tension. The end over which the shrink sleeve had been drawn was heated in a cylindrical, hollow cartridge heater to over 140° C. The shrink sleeve contracted, and the fibers were fused together by the effect of the shrinking force. After cooling, the bundle was shortened by 3 cm at the shrunk end, and the end face of the bundle was polished.

The diameter of the fused end of the fiber bundle amounted to 8.6 mm. This illumination bundle exhibited a light transmission of 78%.

We claim:

1. A process for producing an optical coupler for polymer optical waveguides comprising the steps of unidirectionally arranging and bundling two to $10^5$ optical waveguides, placing the optical waveguides within a shrink sleeve of thermoplastic material, and heating the shrink sleeve and waveguides to a temperature above the shrink temperature of the sleeve and higher than the softening temperature of the polymer optical waveguides, such temperature being in the range of 50° to 330° C., to thereby shrink the sleeve, and press and fuse the waveguides together to form a rod.

2. A process as in claim 1 including the step of stretching the bundle of optical waveguides during the heating step to produce a biconical profile in the rod.

3. A process as in claim 1 including the step of stretching the bundle of optical waveguides after the heating step to produce a biconical profile in the rod.

4. A process as in claim 1 wherein the heating step includes heating the shrink sleeve more intensely in the middle thereof than at the ends to produce a bioconical profile in the rod.

5. A process as in claim 1 wherein the shrink sleeve is composed of a polyolefin, polyvinyl chloride, polyvinyl fluoride, polytetrafluoroethylene, polychloroprene, vinylidene fluoride/hexafluoropropylene copolymer, silicon rubber, polyester, fluorinated ethylene/propylene copolymer or polyfluoroalkoxy copolymer.

6. A process as in claim 1 wherein the optical waveguides have optical cladding, and prior to the heating step removing the optical cladding at locations where the waveguides are to be fused together.

* * * * *